United States Patent [19]
Marshall

[11] 3,851,802
[45] Dec. 3, 1974

[54] SINGLE CONE MULTIPLE-ROW PLOT SEEDER

[75] Inventor: Harold G. Marshall, Bellefonte, Pa.

[73] Assignee: The United States of America as represented by the Secretary of Agriculture, Washington, D.C.

[22] Filed: Nov. 15, 1973

[21] Appl. No.: 416,304

[52] U.S. Cl.............. 222/162, 111/34, 111/77, 222/330, 222/410
[51] Int. Cl. ............... A01c 7/12, G01f 11/24
[58] Field of Search .......... 222/162, 168, 330, 410; 111/34, 74, 77

[56] References Cited
UNITED STATES PATENTS

| | | | |
|---|---|---|---|
| 2,016,167 | 10/1935 | Carlson | 222/168 |
| 2,601,534 | 6/1952 | Laffoon | 222/330 |
| 3,117,540 | 1/1964 | Shader, et al. | 111/34 |

Primary Examiner—Robert B. Reeves
Assistant Examiner—Frederick R. Handren
Attorney, Agent, or Firm—M. Howard Silverstein; Max D. Hensley; William E. Scott

[57] ABSTRACT

A single cone plot seeder for distributing seed simultaneously to a plurality of rows. The distributing apparatus, mounted on a framework behind a conventional tractor with conventional drive and planting means, has a rotary shell supported on a stationary base and operatively connected to a distributing cone by a plurality of radially disposed sweeper blades. The base has a plurality of uniformly spaced slots adjacent to its periphery and in angular relationship with the radially disposed sweeper blades. Funnel members secured beneath each slot guide the seed through a distributor tube to a double disc opener for planting. A seed hopper is mounted on the upper portion of the cone and when lifted the seeds slide down the grooved lower portion of the cone and are distributed on the stationary base. In operation, the cone, shell and sweeper blades rotate one-fifth of a revolution to distribute completely each charge of seed. Thus, seeds of a subsequent charge are not contaminated by those of prior charges.

4 Claims, 3 Drawing Figures

PATENTED DEC 3 1974 3,851,802

SINGLE CONE MULTIPLE-ROW PLOT SEEDER

The present invention relates to an apparatus for simultaneously distributing seed uniformly in more than one row and more particularly to a single cone, multiple row plot seeder in which a single seed charge is completely distributed with each preset portion of a revolution of the cone.

Mechanical planters to seed experimental plots connected with breeding, evaluation and production research in field crops are known in the art. They eliminate expensive and laborious hand distribution of seed in nursery planting and provide more uniform placement of seed in the soil. Individual belts or a single belt and baffle divider to distribute seeds to the furrow openers as well as cone seed distributors are among the prior art. However, with regard to the cone seed distributors now in use, either one cone unit is needed for each row to be planted or a separate spinning seed divider is needed in conjunction with the cone.

Therefore, it is an object of this invention to provide an apparatus having a single cone that can distribute seed simultaneously into more than one row.

Another object of this invention is to provide a single cone apparatus that does not need a spinning seed divider for distributing seed simultaneously to more than one row.

Still another object of this invention is to provide an apparatus from which each charge of seed is completely distributed from the apparatus thus avoiding any seed hold-up and mixing with subsequent seed charges.

A still further object of this invention is to provide an apparatus that allows planting to be nonstop and seeding continuous from plot to plot even when each seed charge is a different type or variety of seed.

According to this invention, the above objects are accomplished by an apparatus comprising a distributing assembly mounted on a framework behind a conventional crawler type tractor, a chain and sprocket type drive means and a planting unit consisting of conventional grain drill, double disc openers. The distributing apparatus is comprised of a rotary shell supported on a stationary base and operatively connected to the distributor cone by a plurality of radially disposed sweeper blades that are permanently attached to the shell and to the cone. The distributor cone is driveably connected to a shaft which is operatively connected to the drive means. The stationary base in the embodiment of this invention made to demonstrate the utility of the apparatus has five uniformly spaced slots adjacent to the periphery of the base and in angular relationship with radially disposed sweeper blades. However, the number of slots can be changed without affecting the inventive concept. The lower portion of the distributor cone is provided with a plurality of grooves which guide the seeds downwardly and distribute them on the base when the seed hopper which is mounted on the upper ungrooved portion of the cone, is lifted by the operator. The apparatus is provided with a funnel member secured beneath each slot in the stationary base. Each funnel member has a distributor tube attached to it which guides the seed to a double disc opener for planting. In operation the cone, shell and sweeper blades rotate over the stationary base and sweep the seed into one of the slots in the base. In the embodiment of the invention made to demonstrate its usefulness, the cone, shell and sweeper blades rotate one-fifth of a revolution per charge of seed per five row 14 foot plot. However, the invention is not limited to that particular performance. Row length can easily be changed by simple, conventional alterations in the drive means.

The apparatus will now be described with reference to the drawings, wherein.

Figures 1, 2, 3:
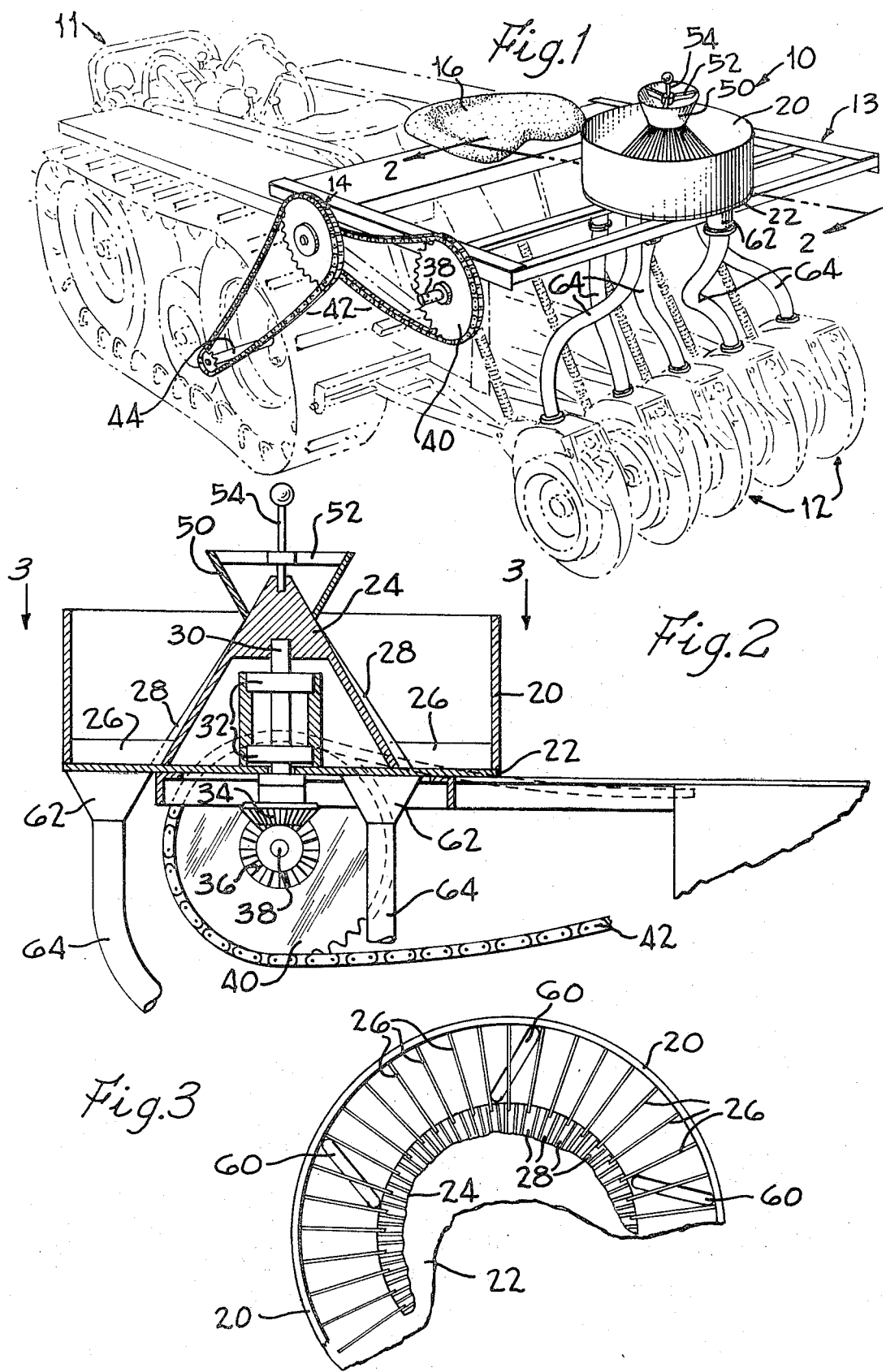
FIG. 1 is a perspective view of the single cone multiple plot seeder mounted on the rear of a crawler-type tractor including the standard, grain drill double disc openers.
FIG. 2 is a fragmental sectional view taken on line 2—2 of FIG. 1.
FIG. 3 is a fragmental top plan view taken in the direction of the arrows 3—3 of FIG. 2.

Referring to the figures, FIG. 1 shows in solid lines the apparatus 10 of this invention mounted in conjunction with a conventional crawler type tractor 11 and conventional double disc openers 12, the conventional items being shown in phantom lines. Briefly the apparatus consists of a distributor assembly 10 mounted on a framework 13 and having a drive means 14 associated with it. Also mounted on framework 13 is operator's seat 16. The distributor assembly 10 consists of rotary shell 20 supported on stationary base 22 and operatively connected to distributor cone 24 by means of a plurality of sweeper blades 26 which are permanently attached to both members 20 and 24. As seen in FIGS. 1 and 2 the lower portion of cone 24 is provided with multiple grooves 28 that conduct seed to base 22 between sweeper blades 26.

Cone 24 is drivably connected to shaft 30 which is supported in bearings 32 and which has secured to its lower end, beveled gear 34. Gear 34 is operatively associated with a second beveled gear 36 secured to drive shaft 38 as shown in FIG. 2. Outboard on shaft 38 is operatively mounted sprocket 40, a part of drive means 14. Drive means 14 comprises a suitable chain and sprocket transmission, as indicated by 42, from the drive axle 44 of tractor 11.

Mounted at the upper ungrooved end of distributor cone 24 is seed hopper 50 slidably supported by means of spider 52 on rod 54.

When hopper 50, charged with seed, is lifted, the seeds are distributed downwardly via grooves 28 to stationary base 22 between sweeper blades 26.

As shown in FIG. 3, five slots 60 are uniformly spaced adjacent the periphery of stationary base 22. Slots 60 are in angular relationship with radially disposed sweeper blades 26. Beneath slots 60 are secured flattened funnel members 62, each having a distributor tube 64 dependent therefrom. As seen in FIG. 1, each of the five distributor tubes 64 leads to an individual double disc opener 12.

The method of using the apparatus of this invention to seed a plot(s) will be described with reference to FIGS. 1, 2 and 3.

The operator sitting on seat 16 pours seed for one or more plots into hopper 50. As tractor 11 moves forward and reaches the point where seeding is to start, the operator lifts hopper 50, the seeds slide downwardly via grooves 28 on cone 24 and are distributed on base 22 between sweeper blades 26. As the tractor 11 continues to move forward cone 24, sweeper blades 26 and shell 20 rotate on stationary base 22 and the seeds distributed between blades 26 on base 22 are swept into one of the five slots 60. The seeds drop through funnel members 62 and distributor tubes 64 to one of the double disc openers 12 from which they are planted in the soil.

As shown in FIG. 1, the relationship of distributor assembly 10 to drive means 14 is such that one charge of seed is planted in each five row 14 foot plot. Cone 24, sweeper blades 26, and shell 20 rotate one-fifth of a revolution per plot so that all of the seed in each charge is swept out of the apparatus. No seed remains in the apparatus to mix with any succeeding seed charge. Consequently, different types and varieties of seeds can be planted successively.

In addition to the advantages previously noted, another advantage of this invention is that it allows seeding to be continuous even when successive charges are of different seed types and varieties. Also, row length can be varied by a simple adjustment of drive means 14.

I claim:

1. A single cone, multiple row plot seeder distributor, comprising,
   a. a stationary base having a plurality of uniformly spaced slots adjacent to its periphery;
   b. a rotary shell supported on said base;
   c. a cone, the lower portion of which is provided with a plurality of grooves;
   d. a plurality of radially disposed sweeper blades, each of which is connected at its opposite ends to both the cone and the rotary shell so as to permit simultaneous rotary movement of the shell, sweeper blades and cone with respect to the base;
   e. a seed hopper mounted on the upper ungrooved portion of the cone; and
   f. drive means for rotating the cone, shell and sweeper blades.

2. The plot seed distributor of claim 1 wherein the slots in the stationary base are in angular relationship with the radially disposed sweeper blades.

3. The plot seed distributor of claim 2 wherein the cone, shell and sweeper blades rotate one-fifth of a revolution per charge of seed.

4. The plot seed distributor of claim 2 wherein a funnel member having a distributor tube is secured beneath each slot in the stationary base.

* * * * *